United States Patent [19]

Van Husen

[11] 4,300,021

[45] Nov. 10, 1981

[54] LINE CIRCUIT CONTROLLED BY A HALL EFFECT DEVICE

[75] Inventor: Hendrik Van Husen, Glen Ellyn, Ill.

[73] Assignee: GTE Automatic Electric Labs Inc., Northlake, Ill.

[21] Appl. No.: 105,838

[22] Filed: Dec. 20, 1979

[51] Int. Cl.³ .............................................. H04M 3/22
[52] U.S. Cl. ................................................ 179/18 FA
[58] Field of Search ........... 179/18 FA, 18 F, 18 FG, 179/18 FF

[56] References Cited

U.S. PATENT DOCUMENTS 3,851,108 11/1974 Freimanis ......................... 179/18 F

FOREIGN PATENT DOCUMENTS 54-98104 8/1979 Japan ............................. 179/18 FA

OTHER PUBLICATIONS

"LSI Yields High Reliability", Wellenstein, *IEEE Spectrum*, Oct. 1979, pp. 78-81.

*Primary Examiner*—Thomas W. Brown
*Attorney, Agent, or Firm*—Robert J. Black; Gregory G. Hendricks

[57] ABSTRACT

A circuit which performs both the supervisory functions and transmission functions of a line circuit under control of a Hall effect device. A Hall effect device operates in the magnetic field generated by the transmission transformer to produce a proportionate signal. This signal is used by the Pulse Code Modulation (PCM) processing circuitry of the line circuit for transmission signals and it is used by a level discriminator to generate supervisory signals.

7 Claims, 1 Drawing Figure

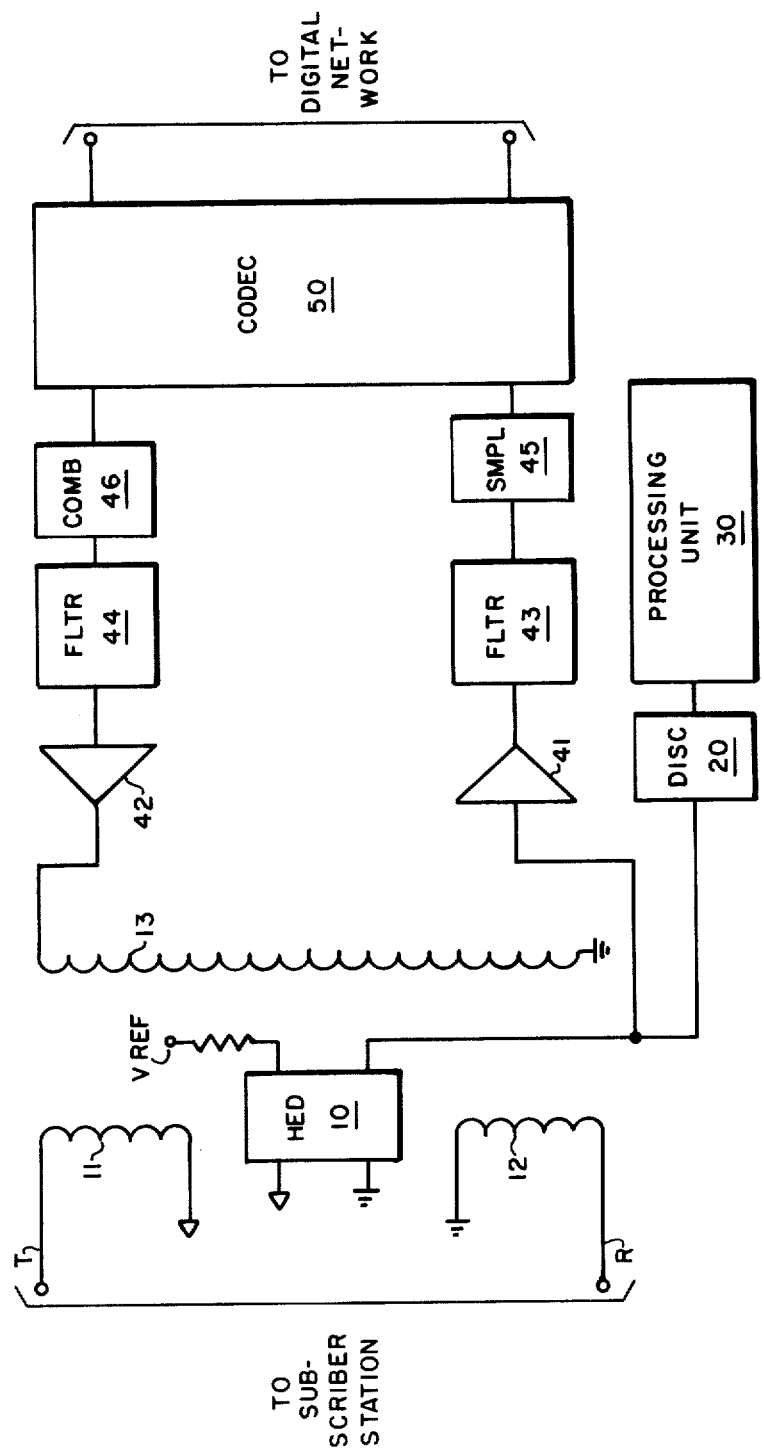

LINE CIRCUIT CONTROLLED BY A HALL EFFECT DEVICE

BACKGROUND OF THE INVENTION (1) Field of the Invention

The present invention relates to telephone subscriber line circuits used in digital telephone offices and more particularly to the use of a Hall effect device in a line circuit to generate supervisory and transmission signals.

(2) Description of the Prior Art

Typically line circuits use a line relay to perform the supervisory functions of loop, dial pulse and ring trip detection, and further require the use of a cutoff relay to disconnect the line relay when the line circuit operates to transmit subscriber signals. More recent line circuits have used Hall effect devices to perform the supervisory functions. However, they still require either a cutoff relay, or balanced coils and a capacitive shunt between tip and ring leads, to generate the magnetic flux for the Hall effect device, and to provide longitudinal balance. Examples of such line circuits include R. J. Sabon's U.S. Pat. Nos. 4,166,928 and 4,191,859 issued on Sept. 4, 1979 and Mar. 4, 1980 respectively. However, such circuits require longitudinally balanced coils to generate the magnetic flux for the Hall effect device, and also these circuits could only use the Hall effect device for the supervisory function of the line circuit. Accordingly, it is the object of the present invention to provide a circuit which can perform both the supervisory and transmission functions of a line circuit under control of a Hall effect device and without the need for longitudinally balanced coils or a cutoff relay.

SUMMARY OF THE INVENTION

The present invention is a circuit which provides supervisory and transmission functions of a line circuit under control of a Hall effect device. This circuit consists of a Hall effect device included in the magnetic field of a transmission transformer. A DC level discriminator is connected between the Hall effect device and a processing unit and an amplifier is connected between the Hall effect device and PCM processing circuitry of the line circuit. The PCM processing circuitry is further connected to the secondary winding of the transmission transformer.

When a telephone subscriber's hookswitch is operated, the subscriber loop is established to the line circuit and current flows from battery to ground through the transmission transformer. The current flow in this transformer produces a magnetic flux which is detected by the Hall effect device which generates a signal proportional to the magnetic flux detected. A DC level discriminator turns on when this signal reaches a predetermined level and signals the processing unit to indicate the off-hook status of the subscriber station. Similarly, the Hall effect device detects changes in loop current in response to dial pulsing and ring trip detection.

The Hall effect device is also used to generate transmission signals since it generates its output signal continuously and proportionally to the magnetic flux generated by the current flowing in the subscriber loop. Subsequently, the Pulse Code Modulation (PCM) processing circuitry amplifies, filters, samples and codes such signals into a PCM signal which can be sent to the digital network during the transmission stage of the subscriber call.

The secondary winding of the transmission transformer is used to couple signals received from the digital network to the subscriber station. The signals from the digital network are coverted by the PCM processing circuitry from PCM signals to analog signals. The secondary winding couples these signals to the primary windings of the transmission transformer which applies them to the subscriber station.

DESCRIPTION OF THE DRAWING

The single FIGURE of the accompanying drawing is a schematic diagram of a line circuit controlled by a Hall effect device in accordance with the present invention.

DESCRIPTION OF THE PREFERRED EMBODIMENT

Referring now to the accompanying drawing, the line circuit of the present invention is shown.

Primary windings 11 and 12 of the isolation transformer are connected to the tip and ring leads of the subscriber loop. Hall effect device 10 is connected in magnetic field proximity to windings 11 and 12 and is further connected to level discriminator 20 which is connected to processing unit 30. Hall effect device 10 is further connected to amplifier 41 which is connected to filter 43. Sampling circuit 45 is connected to filter 43 and codec 50 which is also connected to combining circuit 46. Filter 44 is connected to combining circuit 46 and to amplifier 42 which is connected to secondary winding 13.

When the subscriber's hookswitch is not operated there is no loop across the tip and ring lead and consequently current does not flow from battery to ground through primary windings 11 and 12.

Consequently no magnetic flux is generated by primary windings 11 and 12, so Hall effect device 10 does not generate an output signal. When the subscriber station hookswitch is operated, however, a loop is established across the tip and ring leads and current flows through primary windings 11 and 12 causing a magnetic flux to be generated. Hall effect device 10 detects this magnetic flux and generates an output signal proportional to the magnetic flux. If the level of this signal is above the threshold level of level discriminator 20, the level discriminator will generate an off-hook signal which is detected by processing unit 30. Thus the Hall effect device will cause level discriminator 20 to generate on-hook and off-hook signals in response to loop detection, dial pulsing or ring trip. In this manner the Hall effect device operates to perform the supervisory functions of the line circuit.

The output signal from Hall effect device 10 is also transferred to amplifier 41 where it is amplified and then filtered by filter 43. Sampling circuit 45 samples this output signal for a predetermined time and generates a pulse amplitude modulated (PAM) signal which is transferred to codec 50 which converts the PAM signal to a pulse code modulated (PCM) signal for transfer to a digital network. Thus the Hall effect device can also be used to perform the transmission function of the line circuit since it generates an output signal proportional to the flux generated by the current flowing in the subscriber loop. Hall effect device 10 however performs no function when signals are transferred from the digital network to the subscriber station. In that case the PCM signals from the digital network are converted to PAM signals by codec 50. Combining circuit 46 reconstructs a continuous analog signal from the PAM signals. These analog signals are filtered by filter 44 and amplified by amplifier 42. Secondary winding 13 then couples these signals to primary windings 11 and 12 for use by the subscriber station.

The use of a Hall effect device to perform supervisory and transmission functions in a line circuit eliminates the need for longitudinally balanced coils and a cutoff relay. Through use of a level discriminator its output can be used to perform the supervisory functions. Also, since the Hall effect device generates an output signal proportional to the flux detected by it, this output signal can be used as a transmission signal by PCM processing circuitry.

It will be obvious to those skilled in the art that numerous modifications of the present invention can be made without departing from the spirit of the invention which shall be limited only by the scope of the claims appended hereto.

What is claimed is:

1. A line circuit for use in a digital telephone office including battery and ground sources and a subscriber station including a hookswitch, said line circuit comprising:
   a transmission transformer having primary winding means connected to said battery and ground sources and to said subscriber station, operated in response to current flow through said primary winding means via operation of said hookswitch to generate a first magnetic flux;
   magnetic flux detection means located in magnetic field proximity to said transmission transformer, operated in response to said first magnetic flux to generate a first analog signal representative of the intensity of said magnetic flux; and
   first pulse code modulation processing circuitry connected to said magnetic flux detection means, operated in response to said first analog signal to generate a first pulse code modulation signal representative of said first analog signal.

2. A line circuit as claimed in claim 1, wherein said telephone office further includes a digital network operated to generate a second pulse code modulation signal, said line circuit further comprising:
   second pulse code modulation processing circuitry connected to said digital network, operated in response to said second pulse code modulation signal to generate a second analog signal;
   said transmission transformer further comprising a secondary winding connected to said second pulse code modulation processing circuitry, operated in response to said second analog signal to generate a second magnetic flux representative of said second analog signal; and
   said primary winding means further operated in response to said second magnetic flux to generate a third analog signal representative of said second magnetic flux.

3. A line circuit as claimed in claim 1, wherein there is further included:
   an analog level discriminator connected to said magnetic flux detection means, operated in response to a predetermined level of said first analog signal to generate an off-hook signal.

4. A line circuit as claimed in claim 1, wherein said primary winding means comprises:
   a first winding connected to said battery source and a second winding connected to said ground source.

5. A line circuit as claimed in claim 1, wherein: said magnetic flux detection means comprises a Hall effect device.

6. A line circuit as claimed in claim 1, wherein said first pulse code modulation processing circuitry comprises:
   a first filter connected between a first amplifier and sampling means which is connected to a codec.

7. A line circuit as claimed in claim 6, wherein: said second pulse code modulation processing circuitry comprises a second filter connected between a second amplifier and a combining means which is connected to said codec.

* * * * *